(12) United States Patent
Kalos et al.

(10) Patent No.: US 7,840,720 B2
(45) Date of Patent: Nov. 23, 2010

(54) USING PRIORITY TO DETERMINE WHETHER TO QUEUE AN INPUT/OUTPUT (I/O) REQUEST DIRECTED TO STORAGE

(75) Inventors: Matthew Joseph Kalos, Tucson, AZ (US); Bruce McNutt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/060,215

(22) Filed: Mar. 31, 2008

(65) Prior Publication Data

US 2009/0248917 A1 Oct. 1, 2009

(51) Int. Cl.
*G06F 13/14* (2006.01)
*G06F 13/18* (2006.01)

(52) U.S. Cl. .............................. 710/6; 710/39; 710/40; 710/74; 711/158

(58) Field of Classification Search .................... None
See application file for complete search history.

(56) References Cited

U.S. PATENT DOCUMENTS

| | | | |
|---|---|---|---|
| 6,292,856 | B1 | 9/2001 | Marcotte |
| 6,839,817 | B2 * | 1/2005 | Hyde et al. ............... 711/154 |
| 7,089,381 | B2 | 8/2006 | Horn et al. |
| 2004/0205297 | A1 | 10/2004 | Bearden |
| 2006/0294412 | A1 | 12/2006 | Ahmadian et al. |
| 2007/0255897 | A1 | 11/2007 | McNutt |
| 2008/0307130 | A1 * | 12/2008 | Chang ........................ 710/74 |

OTHER PUBLICATIONS

International Search Report and Written Opinion, dated Jun. 16, 2009, for Application No. PCT/ EP2009/ 053611, 10 pp.
Response to PCT Office Action, dated Aug. 3, 2009, for Application No. PCT/ EP2009/053611, 10 pp.
Bruce McNutt, "Disk Arm Management of Competing Workloads", International Business Machines Corporation, pp. 1-6.
"SCSI Architecture Model-3 (SAM-3)", International Committee for Information Technology Standards, T10 Project 1561-D, Revision 14, Sep. 21, 2004. See, Sec. 8.7.

* cited by examiner

*Primary Examiner*—Ilwoo Park
(74) *Attorney, Agent, or Firm*—David W. Victor; Konrad Raynes and Victor LLP

(57) ABSTRACT

Provided are a method, system, and article of manufacture for using priority to determine whether to queue an Input/Output (I/O) request directed to storage. A maximum number of concurrent requests directed to a storage is measured. The measured maximum number of concurrent requests is used to determine a threshold for a specified priority. Subsequent requests of the specified priority directed to the storage are allowed to proceed in response to determining that a current number of concurrent requests for the specified priority does not exceed the determined threshold for the specified priority. Subsequent requests directed to the storage having a priority greater than the specified priority are allowed to proceed. Subsequent requests directed to the storage having the specified priority are queued in a queue in response to determining that the current number of concurrent requests for the specified priority exceeds the overall threshold.

33 Claims, 4 Drawing Sheets

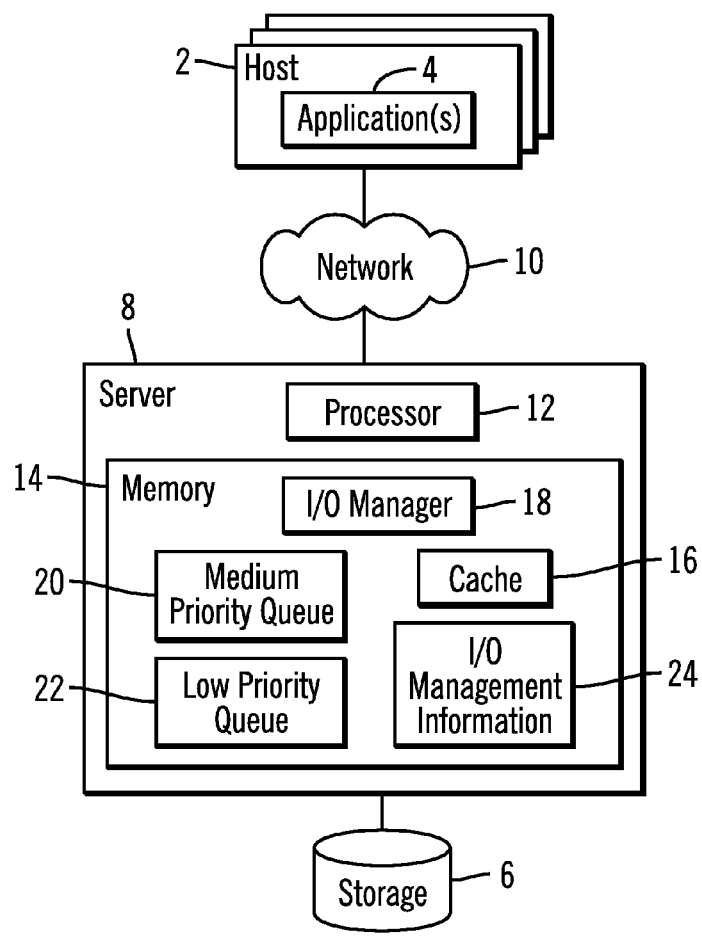
FIG. 1
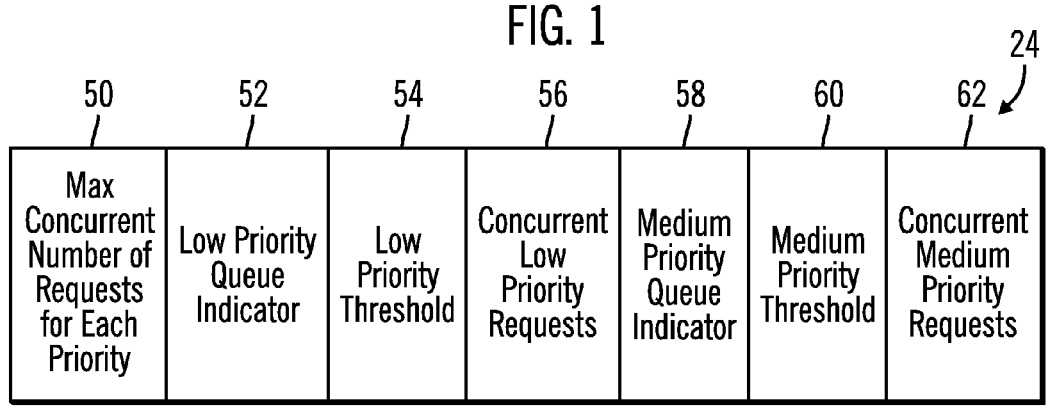
Management Information   FIG. 2

USING PRIORITY TO DETERMINE WHETHER TO QUEUE AN INPUT/OUTPUT (I/O) REQUEST DIRECTED TO STORAGE

BACKGROUND OF THE INVENTION

1. Field of the Invention

The present invention relates to a method, system, and article of manufacture for using priority to determine whether to queue an input/output (I/O) request directed to storage.

2. Description of the Related Art

Storage protocols may specific conditions under which application programs to assign priorities to Input/Output (I/O) requests the application programs generate for a storage device, such that the controller or server processing the I/O requests may utilize the priority when determining how to manage the I/O requests. Recent enhancements to the Small Computer System Interface (SCSI) allow the host application to specify through a priority value a relative scheduling importance of a task in the I/O transmission. Processing of a collection of tasks with different task priorities should cause the subset of tasks with the higher priority to return status sooner in aggregate than the same subset would if the same collection of tasks were submitted under the same conditions but with all task priorities being equal.

There is a need in the art for improved techniques for utilizing the priorities assigned to I/O requests to improve the processing of I/O requests directed to a common storage.

SUMMARY

Provided are a method, system, and article of manufacture for using priority to determine whether to queue an Input/Output (I/O) request directed to storage. A maximum number of concurrent requests directed to a storage is measured. The measured maximum number of concurrent requests is used to determine a threshold for a specified priority. Subsequent requests of the specified priority directed to the storage are allowed to proceed in response to determining that a current number of concurrent requests for the specified priority does not exceed the determined threshold for the specified priority. Subsequent requests directed to the storage having a priority greater than the specified priority are allowed to proceed. Subsequent requests directed to the storage having the specified priority are queued in a queue in response to determining that the current number of concurrent requests for the specified priority exceeds the overall threshold.

In a further embodiment, indication is made to queue the requests of the specified priority and indication is made to not queue requests of at least one priority higher than the specified priority. A request of a priority directed to the storage is received. The request is transmitted to the storage in response to determining that there is no indication to queue requests having the priority of the received request. The received request is queued in the queue in response to determining the indication to queue requests of the priority of the received request and in response to determining that the number of concurrent current requests of the priority of the received request exceeds the threshold for the priority of the received request.

In a further embodiment, the received request is transmitted to the storage in response to determining the indication to queue requests of the received priority and in response to determining that the current number of concurrent requests of the priority of the received requests does not exceed the threshold of the priority of the received request.

In a further embodiment, a determination is made of a highest priority request received during a previous measurement period. Indication is made to queue requests for each priority lower than the determined highest priority and indication is made to not queue requests for each priority higher than the determined highest priority. The measured maximum number of concurrent requests is used to determined the threshold for each priority lower than the determined highest priority.

In a further embodiment, measuring the maximum number of concurrent requests comprises measuring the maximum number of concurrent requests for each priority.

In a further embodiment, the maximum number of concurrent requests are measured during a measurement period. Measuring the maximum number of concurrent requests for each priority comprises incrementing the number of concurrent requests for one of the priorities in response to receiving a request for the priority during the measurement period and decrementing the number of concurrent requests for one of the priorities in response to receiving a request for the priority during the measurement period. The maximum number of concurrent requests for each priority comprises the maximum number of concurrent requests for each priority measured during the measurement period.

In a further embodiment, using the measured maximum number of concurrent requests to determine the threshold for the specified priority comprises using the maximum numbers of concurrent requests for the priorities to determine the threshold for the priorities whose requests are to be queued.

In a further embodiment, the priority thresholds are further determined based on a minimum number of requests to allow for each specified priority.

In a further embodiment, the maximum number of concurrent requests for each priority are measured during a completed measurement period. The thresholds for the priorities to queue are adjusted after each completed measurement period.

In a further embodiment, using the measured maximum number of concurrent requests to determine the threshold for the specified priority comprises determining each priority threshold based on a minimum of the maximum number of concurrent requests observed for at least two of the priorities and the minimum number of requests allowed for the at least two of the priorities.

In a further embodiment, acknowledgment is received that a request of the specified priority completed. A determination is made as to whether the current number of concurrent requests of the specified priority is below the specified priority threshold in response to receiving the acknowledgment. At least one queued request of the specified priority is processed in response to determining that the current number of concurrent requests of the specified priority is below the specified priority threshold.

BRIEF DESCRIPTION OF THE DRAWINGS

FIG. 1 illustrates an embodiment of a computing environment.

FIG. 2 illustrates an embodiment management information for managing I/O requests.

DETAILED DESCRIPTION

Figure 3:
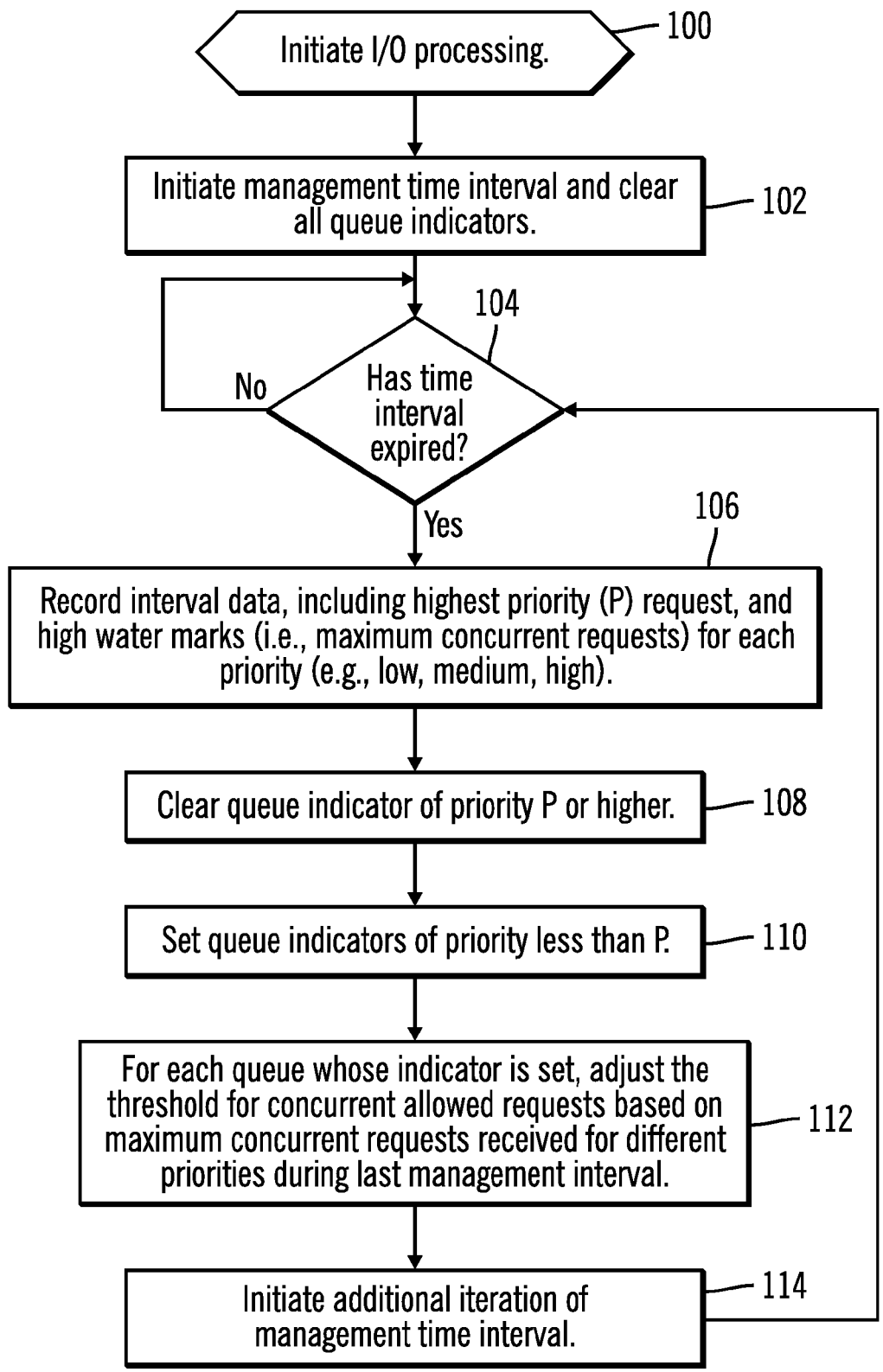
FIG. 3 illustrates an embodiment of operations to determine whether to indicate queuing of I/O requests for specified priorities.

FIG. 1 illustrates a computing environment in which aspects of the invention are implemented. One or more hosts 2 each include one or more applications 4 that generate Input/ Output (I/O) requests to a storage 6 through a server 8. The applications 4, such as database applications, business applications, etc., may assign a priority level to I/O requests sent to the server 8. The priority may specify a numerical or other priority value that is part of a priority scheme. In this way, different applications 4 on different hosts 2 may use the same priority designation protocol, which may be specified as part of an industry standard.

The hosts 2 may communicate with the server 8 via a network 10, such as a Local Area Network (LAN), Storage Area Network (SAN), Wide Area Network (WAN), wireless network, etc. Alternatively, the host 2 may communicate with the server 8 over a bus interface, such as a Peripheral Component Interconnect (PCI) bus. The host 2, storage 6, and server 8 may be housed in separate machines or be included in the same machine connecting via one or more bus interfaces. The server 8 may comprise a suitable storage management system known in the art, such as a storage controller, server, enterprise storage server, etc. The storage 6 may comprise a suitable storage system known in the art, such as a Direct Access Storage Device (DASD), Just a Bunch of Disks (JBOD), a Redundant Array of Independent Disks (RAID), virtualization device, tape storage, optical disk storage, or any other storage system known in the art. The host 2 may comprise any suitable computing device known in the art, such as a workstation, desktop computer, server, mainframe, handheld computer, telephony device, etc. The hosts 2 include application programs that generate I/O requests.

The server 6 includes a processor 12 (or multiple processors) and a memory 14 comprised of one or more volatile and/or non-volatile memory devices. The memory includes a cache 16 to buffer I/O requests and data updates directed to the storage 6, an I/O manager program 18 that manages I/O requests from the hosts 2 directed to the storage 6, a medium priority queue 20, low priority queue 22, and I/O management information 24 used by the I/O manager 18 to determine whether to queue I/O requests in the queues 20 and 22 or allow the requests to proceed.

The I/O manager 18 may be implemented in software loaded into the memory 14 that is executed by the processor 12. Alternatively, the I/O manager 18 may be implemented in a hardware chip set within the server 8.

FIG. 2 illustrates an embodiment of the management information 24, which may include a maximum number of concurrent outstanding I/O requests for each priority level measured for the current management period time interval. Thus, during the management period, the number of concurrent requests outstanding at different times for each priority level (e.g., high, medium, low) is recorded, such that at the end of the management period, the maximum number of concurrent requests during the management period can be determined for each priority level. The number of concurrent requests comprises the number of I/O requests received that have not been completed, i.e., are outstanding to disk or queued. A low priority queue indicator 52 indicates whether the I/O manager 18 is to queue low priority requests received during a management time interval when a current number of outstanding concurrent low priority requests 56 received during the management time interval exceeds a low priority threshold 54 of a maximum number of concurrent low priority I/O requests. A medium priority queue indicator 58 indicates whether the I/O manager 18 is to queue medium priority requests received during a management time interval when a current number of outstanding concurrent medium priority requests 62 received during the management time interval exceeds a medium priority threshold 60 of I/O requests. In alternative embodiments, different information may be maintained in the management information 24.

In one embodiment, the designation of low, medium, and high priorities may correspond to a single priority value or range of priority values set by the host applications 4 as interpreted by the I/O manager 18. For instance, the I/O manager 18 may map numerical priority values to one low, medium or high priority classification. In further embodiments, there may be one or more than two priority queues to queue requests for further priority levels.

In one embodiment, the information maintained for FIG. 2 and the thresholds may be maintained on a per disk basis. Thus, if the storage 6 comprises multiple interconnected hard disk drives, the thresholds of FIG. 2 would be multiplied by the number of disks to determine the thresholds that apply to a multi-disk storage.

FIG. 3 illustrates an embodiment of operations performed by the I/O manager 18 to update the I/O management information 24 every management time interval to determine the extent to which queuing of I/O requests is needed based on the maximum number of concurrent I/O requests (i.e., low, medium, and high) measured during the most recent completed management time interval. Upon initiating (at block 100) I/0 processing, the I/O manager 18 initiates (at block 102) a management time interval set to expire after a period of time, such as a few seconds, and clears all queue indicators 52 and 58. Upon the time interval expiring (at block 104), the I/O manager 18 records (at block 106) interval data, including highest priority (P) request and high water marks (i.e., maximum number concurrent requests) for each priroity (e.g., low, medium, high) during the previously completed management time interval. During a management time period, the I/O manager 18 increments the total number of concurrent I/O requests when a new request of any priority is received and decrements the total number concurrent I/O requests when an I/O request has completed. The number of concurrent I/O requests during the management time interval is the high watermark of the maximum number of I/O requests outstanding during the time period.

The I/O manager clears (at block 108) the queue indicators 52 and 58 for any queues having a priority greater than or equal to the maximum priority request (P) received during the last management interval. The queue indicators 52 and 58 of priorities less than the maximum priority request (P) are set (at block 110) to indicate queuing. For each queue whose indicator is set, the I/O manager 18 adjusts (at block 120) the threshold 54 and 60 for concurrent allowed requests based on maximum concurrent requests received for different priorities during last management interval. Equations (1) and (2) discussed below provide embodiments for adjusting the low 54 and medium 60 priority thresholds. After adjusting the thresholds for priorities to be queued, the I/O manager 18 initiates (at block 114) an additional iteration of the operations by proceeding back to block 104 to await the completion of the next management interval.

With the operations of FIG. 3, the I/O manager 18 determines at the conclusion of a time interval whether to queue I/O requests for different priority levels or whether to cease queuing and complete processing any previously queued I/O requests. Further, the I/O manager adjusts the queuing thresholds for each priority level to be queued during the next measurement period based on the maximum number of requests received for each priority level during the previous time period. To adjust the queuing thresholds, the I/O manager 18 may further consider a minimum number of allowed requests for each priority level as discussed below. Although FIG. 3 shows determining whether to allow queuing for two priority levels, low and medium, the determinations and queue indicators may be provided for more than two priority levels.

Figure 4:
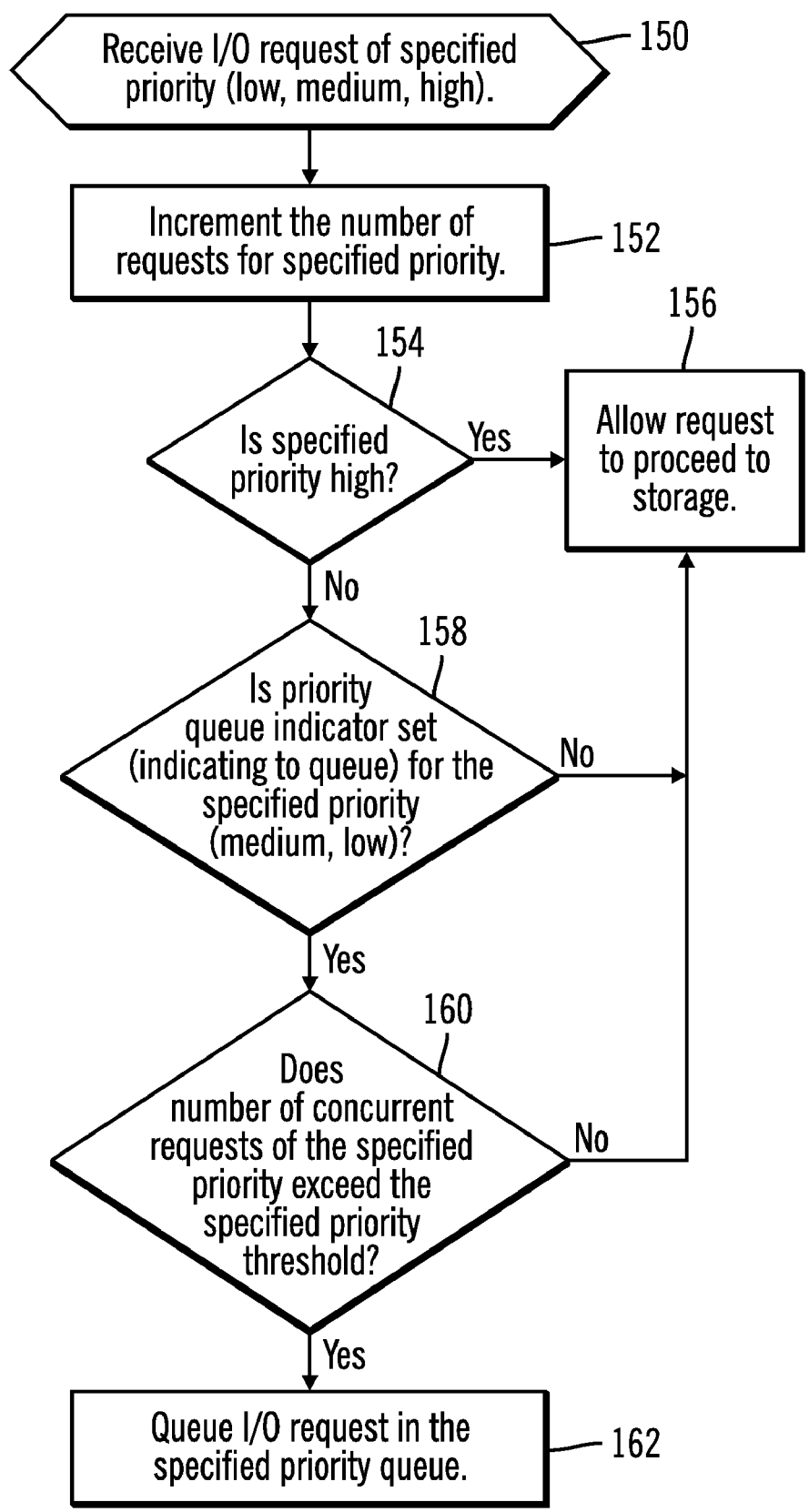
FIG. 4 illustrates an embodiment of operations to determine whether to queue a received I/O request.

FIG. 4 illustrates an embodiment of operations performed by the I/O manager 18 to process I/O requests during a management time interval. Upon receiving (at block 150) an I/O request of a specified priority (e.g., low, medium high), the I/O manager 18 increments (at block 152) the number of requests for the specified priority 56, 62 or 64. If (at block 154) the specified priority is high, then the I/O request is allowed to proceed (at block 156). If (at block 154) the request is not high priority, e.g., low or medium, and if (at block 158) the priority queue indicator 52 or 58 is not set (indicating to not queue) for the specified priority (medium, low), then control proceeds to block 156 to allow the I/O request to proceed. If (at block 158) the priority queue indicator 52 or 58 is set (indicating to queue for the received I/O request) and if (at block 160) the number of concurrent outstanding requests of the specified priority 56 or 62 exceed the specified priority threshold 54 or 60, then the received I/O request is queued (at block 162) in the specified priority queue 20 or 22. Otherwise, if (at block 160) the number of concurrent outstanding requests of the specified priority 56 or 62 do not exceed the specified priority threshold 54 or 60, then, the I/O request is allowed to proceed. Concurrent I/O requests for a priority level comprise the number of I/O requests received that have not completed or that are queued in the priority level queue 20 and 22.

Figure 5:
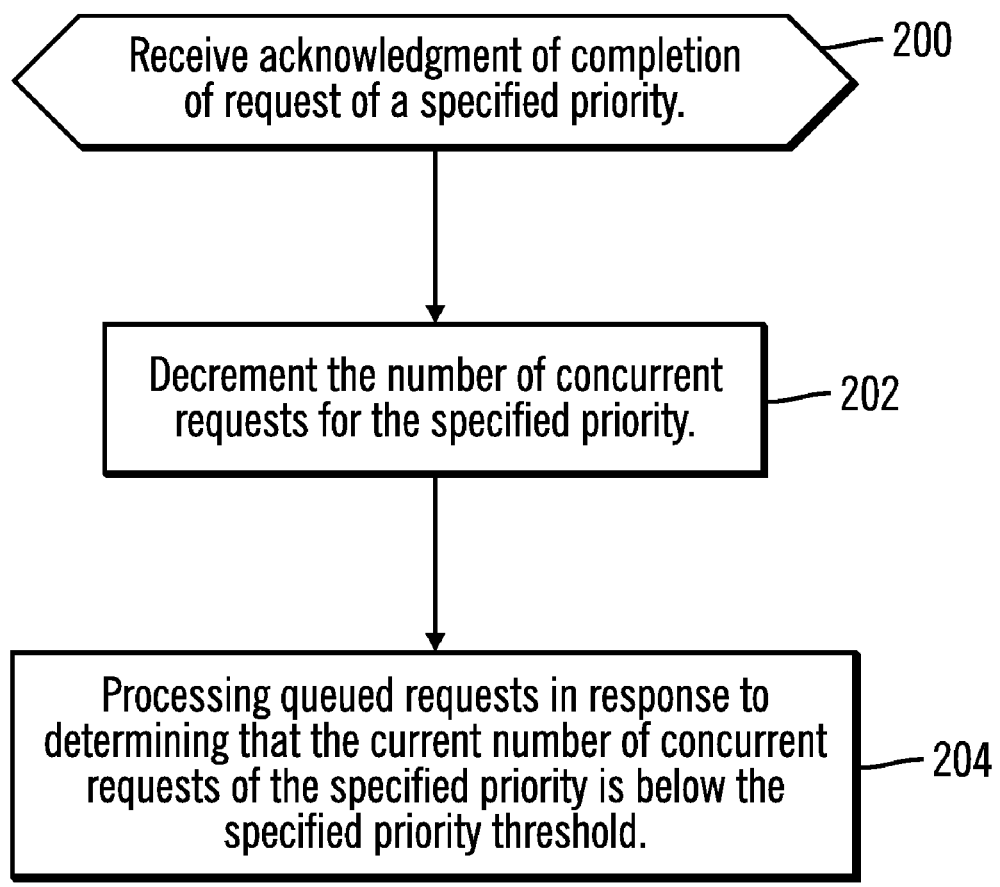
FIG. 5 illustrates an embodiment of operations to process an acknowledgment that an I/O request completed.

FIG. 5 illustrates an embodiment of operations performed by the I/O manager 18 to process an acknowledgment that an I/O request of a priority completed against the storage 6. Upon receiving (at block 200) the acknowledgment, the I/O manager 18 decrements (at block 202) the number of concurrent requests for the specified priority of the completed request. The I/O manager 18 may further process (at block 204) queued requests in response to determining that the current number of concurrent requests of the specified priority is below the specified priority threshold. The queued requests may be processed until the specified priority threshold of concurrent requests for the priority level is again reached.

In one embodiment, requests of the highest priority level are always allowed to proceed and a determination is made as to whether to queue low or medium priority requests and the queuing threshold for those requests. In an alternative embodiment, high priority requests may also be receiving disk service. Still further, there may be additional priority level queues for more than two priorities.

In one embodiment, to determine the low priority 54 and medium priority 60 thresholds, the following mathematical equations (1) and (2) may be utilized $$U\_hm=\min((T\_h+T\_m), (HWM\_h+HWM\_m)) \quad (1)$$

$$U\_lh=\min((T\_h+T\_l), (HWM\_h+\min(T\_l, HWM\_l))) \quad (2)$$

In Equations (1) and (2), T_h, T_m, and T_l comprise a minimum number of concurrent requests that are allowed for the high, medium, and low priority, respectively, to avoid starvation, i.e., the situation where requests of a low priority are not processed. Concurrent medium and low priority requests above these operational targets may be subject to queueing under the conditions now being presented. However, at least the minimum number of concurrent requests of each type are permitted. In an example of this embodiment, the quantities T_h, T_m, and T_l, when expressed on a per disk basis, might have the values of 2.5, 1.0, and 0.5 respectively. HWM_h comprises a high water mark of high priority requests measured during the previous management period, which comprises the maximum number of high priority concurrent requests observed during the previous management period. Similarly, HWM_m and HWM_m comprise high water marks of medium and low priority requests, respectively, measured during the previous management period, which comprises the maximum number of medium and low concurrent requests observed during the previous management period.

The quantity U_hm, calculated in Equation (1), comprises an allocation of concurrent requests for high and medium priority I/O. In the embodiment of Equations (1) and (2), the approach is to queue low priority requests so as to accommodate high and medium priority requests, up to the allocated level. Thus, in this embodiment, the threshold of the low priority queue 54 is set to T_sum−U_hm, where T_sum is defined to be T_h+T_m+T_l. More intuitively, the net effect of this threshold setting can be described as follows: the total number of concurrent requests subject to queuing is constrained to a maximum of T_sum, if this can be done by setting a threshold of no less than T_l on the number of concurrent low-priority requests receiving disk service.

The quantity U_lh, calculated in Equation (2), comprises an allocation of concurrent requests for high and low priority I/O. In the embodiment of equations (1) and (2), medium priority requests are queued so as to accommodate high and low priority requests, up to the allocated level. Thus, in this embodiment the threshold 60 of the medium priority queue is set to T_sum−U_lm. In this way, the net effect of this threshold setting can be described as follows: the total number of concurrent requests receiving disk service is constrained to a maximum of T_sum, if this can be done by setting a threshold of T_l on the number of concurrent low-priority requests receiving disk service, and a threshold of no less than T_m on the number of concurrent medium-priority requests receiving disk service.

Using the above determined quantities of U_lh and U_mh and if P is the highest priority request observed in the previous management period, the determination of how to proceed for each priority level can be calculated for Q="high", "medium", and "low" as follows:

If Q>=P then place no limit on concurrent disk requests,

Else If Q="medium", then limit the number of concurrent disk requests (on a per disk basis) to T_sum−U_hl, Else if Q="low" limit the number of concurrent disk requests (on a per disk basis) to T_sum−U_hm.

With the above equations, the maximum number of concurrent requests for different priorities are used to determine the queuing threshold for each priority. Further, a minimum number of requests to allow for each priority is also considered in setting the queuing threshold to ensure that a minimum number of requests for each priority are processed. In one of the above embodiments, each priority threshold is adjusted based on a minimum of (1) the maximum number of concurrent requests observed for at least two of the priorities and (2) the minimum number of requests allowed for the at least two of the priorities. Other equations may also be used considering different factors to adjust the queuing thresholds based to maintain the maximum number of concurrent requests for different priorities within desired ranges.

With the described embodiments, a determination is made as to whether to queue I/O requests based on I/O activity, such as a total number of concurrent I/O requests that occurred during a previous management time interval. In still further embodiments, the priority specific threshold at which I/O requests of the specified priority are queued may be adjusted to increase the amount of queuing for a specified priority to reduce the total number of I/O requests below a threshold.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a device, such as a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In the described embodiments, the access parameters are changed for process accesses to memory addresses in a shared memory. In an alternative embodiment, access patterns may be monitored for computer resources other than memory addresses, such as addresses in a storage device and other computer resources.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    measuring a maximum number of concurrent requests directed to a storage for a management period time interval;
    using the measured maximum number of concurrent requests to determine a threshold for a specified priority;
    allowing subsequent requests of the specified priority directed to the storage to proceed in response to determining that a current number of concurrent requests for the specified priority does not exceed the determined threshold for the specified priority;

allowing subsequent requests directed to the storage having a priority greater than the specified priority to proceed;

queuing subsequent requests directed to the storage having the specified priority in a queue in response to determining that the current number of concurrent requests for the specified priority exceeds the overall threshold; and performing additional iterations for additional management period time intervals of measuring the maximum number of concurrent requests to determine the threshold for the specified priority, wherein the threshold determined during the additional iterations is used to determine whether to allow subsequent requests and queue subsequent requests received following the additional iteration.

2. The method of claim 1, further comprising:

setting a first indicator to indicate to queue the requests of the specified priority;

setting a second indicator to indicate to not queue requests of at least one priority higher than the specified priority;

receiving a request of a priority directed to the storage;

transmitting the request to the storage in response to determining that the first or second indicator associated with the priority of the request does not indicate to queue requests having the priority of the received request; and queuing the received request in the queue in response to determining that the first or second indicator associated with the priority of the request indicates to queue requests of the priority of the received request and in response to determining that the number of concurrent current requests of the priority of the received request exceeds the threshold for the priority of the received request.

3. The method of claim 2, further comprising:

transmitting the received request to the storage in response to determining that the first or second indicator indicates to queue requests of the received priority and in response to determining that the current number of concurrent requests of the priority of the received requests does not exceed the threshold of the priority of the received request.

4. The method of claim 1, further comprising:

determining a highest priority request received during a previous measurement period;

indicating to queue requests for each priority lower than the determined highest priority; and indicating to not queue requests for each priority higher than the determined highest priority, wherein the measured maximum number of concurrent requests is used to determine the threshold for each priority lower than the determined highest priority.

5. The method of claim 1, wherein measuring the maximum number of concurrent requests comprises measuring the maximum number of concurrent requests for each priority.

6. The method of claim 5, wherein the maximum number of concurrent requests are measured during a measurement period, and wherein measuring the maximum number of concurrent requests for each priority comprises:

incrementing the number of concurrent requests for one of the priorities in response to receiving a request for the priority during the measurement period; and decrementing the number of concurrent requests for one of the priorities in response to receiving a request for the priority during the measurement period, wherein the maximum number of concurrent requests for each priority comprises the maximum number of concurrent requests for each priority measured during the measurement period.

7. The method of claim 5, wherein using the measured maximum number of concurrent requests to determine the threshold for the specified priority comprises using the maximum number of concurrent requests for the priorities to determine the threshold for the priorities whose requests are to be queued.

8. The method of claim 7, wherein the priority thresholds are further determined based on a minimum number of requests to allow for each specified priority.

9. The method of claim 7, wherein the maximum number of concurrent requests for each priority are measured during a completed measurement period, and wherein the thresholds for the priorities to queue are adjusted after each completed measurement period.

10. The method of claim 5, wherein using the measured maximum number of concurrent requests to determine the threshold for the specified priority comprises determining each priority threshold based on a minimum of the maximum number of concurrent requests observed for at least two of the priorities and the minimum number of requests allowed for the at least two of the priorities.

11. The method of claim 1, further comprising:

receiving acknowledgment that a request of the specified priority completed;

determining whether the current number of concurrent requests of the specified priority is below the specified priority threshold in response to receiving the acknowledgment; and processing at least one queued request of the specified priority in response to determining that the current number of concurrent requests of the specified priority is below the specified priority threshold.

12. A system in communication with a storage, comprising:

an Input/Output (I/O) manager executed to perform operations, the operations comprising:

measuring a maximum number of concurrent requests directed to the storage for a management period time interval;

using the measured maximum number of concurrent requests to determine a threshold for a specified priority;

allowing subsequent requests of the specified priority directed to the storage to proceed in response to determining that a current number of concurrent requests for the specified priority does not exceed the determined threshold for the specified priority;

allowing subsequent requests directed to the storage having a priority greater than the specified priority to proceed;

queuing subsequent requests directed to the storage having the specified priority in a queue in response to determining that the current number of concurrent requests for the specified priority exceeds the overall threshold; and performing additional iterations for additional management period time intervals of measuring the maximum number of concurrent requests to determine the threshold for the specified priority, wherein the threshold determined during the additional iterations is used to determine whether to allow subsequent requests and queue subsequent requests received following the additional iteration.

13. The system of claim 12, wherein the operations further comprise:
- setting a first indicator to indicate to queue the requests of the specified priority;
- setting a second indicator to indicate to not queue requests of at least one priority higher than the specified priority;
- receiving a request of a priority directed to the storage;
- transmitting the request to the storage in response to determining that the first or second indicator associated with the priority of the request does not indicate to queue requests having the priority of the received request; and
- queuing the received request in the queue in response to determining that the first or second indicator associated with the priority of the request indicates to queue requests of the priority of the received request and in response to determining that the number of concurrent current requests of the priority of the received request exceeds the threshold for the priority of the received request.

14. The system of claim 13, wherein the operations further comprise:
- transmitting the received request to the storage in response to determining that the first or second indicator indicates to queue requests of the received priority and in response to determining that the current number of concurrent requests of the priority of the received requests does not exceed the threshold of the priority of the received request.

15. The system of claim 12, wherein the operations further comprise:
- determining a highest priority request received during a previous measurement period;
- indicating to queue requests for each priority lower than the determined highest priority; and
- indicating to not queue requests for each priority higher than the determined highest priority, wherein the measured maximum number of concurrent requests is used to determine the threshold for each priority lower than the determined highest priority.

16. The system of claim 12, wherein measuring the maximum number of concurrent requests comprises measuring the maximum number of concurrent requests for each priority.

17. The system of claim 16, wherein the maximum number of concurrent requests are measured during a measurement period, and wherein measuring the maximum number of concurrent requests for each priority comprises:
- incrementing the number of concurrent requests for one of the priorities in response to receiving a request for the priority during the measurement period; and
- decrementing the number of concurrent requests for one of the priorities in response to receiving a request for the priority during the measurement period, wherein the maximum number of concurrent requests for each priority comprises the maximum number of concurrent requests for each priority measured during the measurement period.

18. The system of claim 16, wherein using the measured maximum number of concurrent requests to determine the threshold for the specified priority comprises using the maximum number of concurrent requests for the priorities to determine the threshold for the priorities whose requests are to be queued.

19. The system of claim 18, wherein the priority thresholds are further determined based on a minimum number of requests to allow for each specified priority.

20. The system of claim 18, wherein the maximum number of concurrent requests for each priority are measured during a completed measurement period, and wherein the thresholds for the priorities to queue are adjusted after each completed measurement period.

21. The system of claim 16, wherein using the measured maximum number of concurrent requests to determine the threshold for the specified priority comprises determining each priority threshold based on a minimum of the maximum number of concurrent requests observed for at least two of the priorities and the minimum number of requests allowed for the at least two of the priorities.

22. The system of claim 12, wherein the operations further comprise:
- receiving acknowledgment that a request of the specified priority completed;
- determining whether the current number of concurrent requests of the specified priority is below the specified priority threshold in response to receiving the acknowledgment; and
- processing at least one queued request of the specified priority in response to determining that the current number of concurrent requests of the specified priority is below the specified priority threshold.

23. An article of manufacture comprising a computer readable storage medium having code executed to communicate with a storage and to perform operations, the operations comprising:
- measuring a maximum number of concurrent requests directed to the storage for a management period time interval;
- using the measured maximum number of concurrent requests to determine a threshold for a specified priority;
- allowing subsequent requests of the specified priority directed to the storage to proceed in response to determining that a current number of concurrent requests for the specified priority does not exceed the determined threshold for the specified priority;
- allowing subsequent requests directed to the storage having a priority greater than the specified priority to proceed;
- queuing subsequent requests directed to the storage having the specified priority in a queue in response to determining that the current number of concurrent requests for the specified priority exceeds the overall threshold; and
- performing additional iterations for additional management period time intervals of measuring the maximum number of concurrent requests to determine the threshold for the specified priority, wherein the threshold determined during the additional iterations is used to determine whether to allow subsequent requests and queue subsequent requests received following the additional iteration.

24. The article of manufacture of claim 23, wherein the operations further comprise:
- setting a first indicator to indicate to queue the requests of the specified priority;
- setting a second indicator to indicate to not queue requests of at least one priority higher than the specified priority;
- receiving a request of a priority directed to the storage;
- transmitting the request to the storage in response to determining that the first or second indicator associated with the priority of the request does not indicate to queue requests having the priority of the received request; and
- queuing the received request in the queue in response to determining that the first or second indicator associated with the priority of the request indicates to queue requests of the priority of the received request and in response to determining that the number of concurrent current requests of the priority of the received request exceeds the threshold for the priority of the received request.

25. The article of manufacture of claim 24, wherein the operations further comprise:
transmitting the received request to the storage in response to determining that the first or second indicator indicates to queue requests of the received priority and in response to determining that the current number of concurrent requests of the priority of the received requests does not exceed the threshold of the priority of the received request.

26. The article of manufacture of claim 23, wherein the operations further comprise:
determining a highest priority request received during a previous measurement period;
indicating to queue requests for each priority lower than the determined highest priority; and
indicating to not queue requests for each priority higher than the determined highest priority, wherein the measured maximum number of concurrent requests is used to determine the threshold for each priority lower than the determined highest priority.

27. The article of manufacture of claim 23, wherein measuring the maximum number of concurrent requests comprises measuring the maximum number of concurrent requests for each priority.

28. The article of manufacture of claim 27, wherein the maximum number of concurrent requests are measured during a measurement period, and wherein measuring the maximum number of concurrent requests for each priority comprises:
incrementing the number of concurrent requests for one of the priorities in response to receiving a request for the priority during the measurement period; and
decrementing the number of concurrent requests for one of the priorities in response to receiving a request for the priority during the measurement period, wherein the maximum number of concurrent requests for each priority comprises the maximum number of concurrent requests for each priority measured during the measurement period.

29. The article of manufacture of claim 27, wherein using the measured maximum number of concurrent requests to determine the threshold for the specified priority comprises using the maximum number of concurrent requests for the priorities to determine the threshold for the priorities whose requests are to be queued.

30. The article of manufacture of claim 29, wherein the priority thresholds are further determined based on a minimum number of requests to allow for each specified priority.

31. The article of manufacture of claim 29, wherein the maximum number of concurrent requests for each priority are measured during a completed measurement period, and wherein the thresholds for the priorities to queue are adjusted after each completed measurement period.

32. The article of manufacture of claim 27, wherein using the measured maximum number of concurrent requests to determine the threshold for the specified priority comprises determining each priority threshold based on a minimum of the maximum number of concurrent requests observed for at least two of the priorities and the minimum number of requests allowed for the at least two of the priorities.

33. The article of manufacture of claim 23, wherein the operations further comprise:
receiving acknowledgment that a request of the specified priority completed;
determining whether the current number of concurrent requests of the specified priority is below the specified priority threshold in response to receiving the acknowledgment; and
processing at least one queued request of the specified priority in response to determining that the current number of concurrent requests of the specified priority is below the specified priority threshold.

* * * * *